(No Model.)
C. GRAF.
BACK PRESSURE VALVE FOR PNEUMATIC TIRES.
No. 606,383. Patented June 28, 1898.
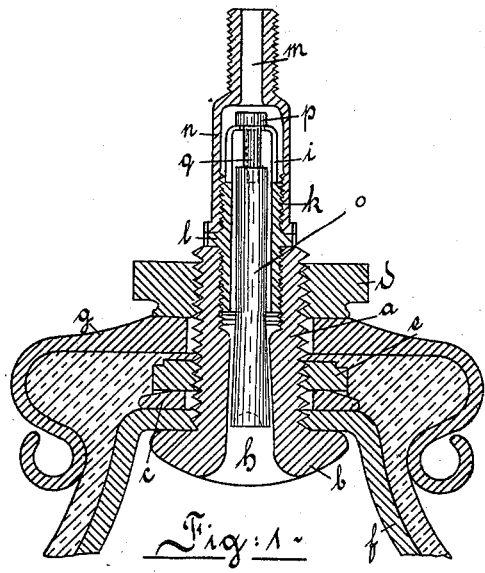
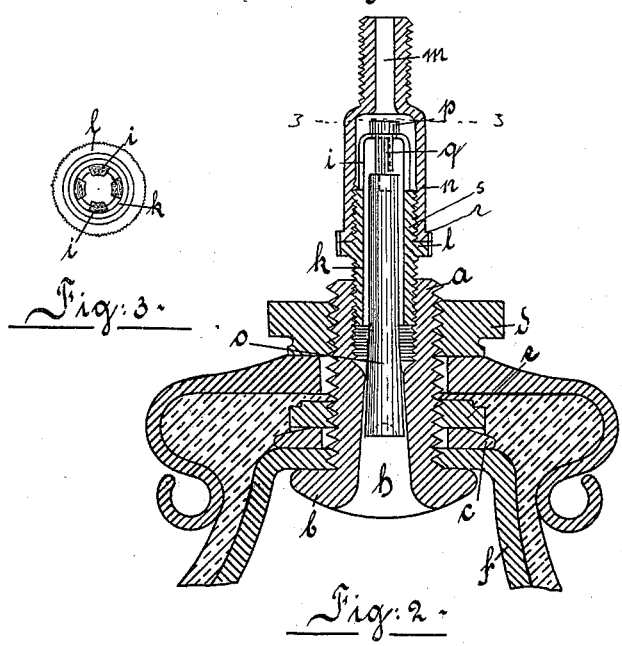
Witnesses:
L. M. Hachschlager
Geo. E. Morse
Inventor
Carl Graf
By Briesen & Knauth
his Attorneys

UNITED STATES PATENT OFFICE.

CARL GRAF, OF MÜHLHAUSEN, GERMANY, ASSIGNOR TO LUDWIG RATZINGER AND WILHELM WEIDENKAFF, OF MUNICH, GERMANY.

BACK-PRESSURE VALVE FOR PNEUMATIC TIRES.

SPECIFICATION forming part of Letters Patent No. 606,383, dated June 28, 1898.

Application filed July 10, 1897. Serial No. 644,457. (No model.)

*To all whom it may concern:*

Be it known that I, CARL GRAF, a resident of Mühlhausen, Thüringen, in the Kingdom of Prussia, Germany, have invented a certain new and Improved Back-Pressure Valve for Pneumatic Tires, Air-Cushions, and the Like, of which the following is a specification.

My invention relates to back-pressure valves for pneumatic tires, air-cushions, and the like, and has for its object to produce a back-pressure valve which will efficiently seal the valve-stem.

My invention has for its further object the production of a valve wherein the sealing is produced by metallic surfaces in contact, whereby an efficiently-closing durable valve is produced.

My invention will be understood by referring to the accompanying drawings, in which—

Figure 1 is a vertical sectional view through a valve embodying my invention, showing the same as mounted in a wheel-tire and showing the same open for pumping up the tire. Fig. 2 is a similar section showing the valve closed to seal the tire; and Fig. 3 is a plan view looking downward into the stem and showing the valve and its supporting-spider, the parts above the line 3 3 in Fig. 2 being omitted for the purpose of clearer illustration.

Referring to the drawings, $a$ is a sleeve or stem provided interiorly with a conical valve-seat $h$, as shown. The valve-seat $h$ is widest at the lower portion and progressively decreases in diameter toward the upper portion. The sleeve $a$ is screw-threaded exteriorly and is passed through the tire $f$, the washer $c$, the nut $e$, and a milled jam-nut $d$, and is provided with a head $b$, which bears against the inside of the tire, so that by screwing down the jam-nut $d$ the sleeve $a$ will be firmly held in the tire. Above the valve-seat the stem $a$ is enlarged in diameter and interiorly screw-threaded to receive the nipple $k$, which is exteriorly screw-threaded and screwed therein. Intermediate of the length of the nipple $k$ a milled flange $l$ is provided, which projects beyond the screw-threads. Screwing upon the upper portion $s$ of the nipple $k$ is a sleeve $n$, whose upper portion $m$ is exteriorly screw-threaded to receive the pipe of the air-pump. The parts $k$ and $s$ of the nipple are screw-threaded in opposite directions for obvious reasons, and the sleeve $n$ is provided with a milled flange $r$, which abuts firmly against the flange $l$, as shown, thus constituting a two-part nipple. Carried loosely within the nipple is a conical valve $o$, having its conical portion within the valve-seat and extending upward, terminating in a bolt $q$, provided with a head $p$, beneath which is a spider $i$. The spider $i$ is of a springy character, consisting of a series of spring-arms. The conical valve is of a more acute conical character than the valve-seat, so that when it is brought against the valve-seat firmly it will contact therewith along a line instead of making an elongated surface closure, as would be the case if the valve and its seat were cones of the same pitch or inclination. These parts are preferably metallic, so as to be capable of being held firmly together and operated without unnecessary wear. The wear, however, will be compensated for by the increasing diameter of the conical valve, so that when the parts have become slightly worn it will only be necessary to screw them more firmly together in order to effect a firm closure.

Another advantage of having the valve and its seat tapered to different degrees is that it is not necessary that the parts should be accurately machined, as would be the case were the valve and its seat intended to fit along an extended surface of closure.

The mode of using the valve is as follows: The parts being in position shown in Fig. 1, the valve is freely suspended by the valve-arms and the air-pump may be attached and the tire pumped up, and at each stroke of the pump the valve will oscillate up and down, so as to prevent escape of air when the pump is exhausting. When the tire has been pumped up sufficiently hard, the sleeve $n$ and nipple $k$ are screwed upward in the valve-stem, as shown in Fig. 2, thereby raising the valve and seating it firmly in its seat, the closure being effected along a line running around the valve-seat at or near its top. This closure will be firm, but at the same time springy in character, by reason of the fact that the spring $i$ of the spider is under tension.

What I claim, and desire to secure by Letters Patent, is—

1. In a back-pressure valve, the combination of a valve-section having an internally-tapered valve-seat therein, a tapered valve coöperating with said valve-seat, an air-conveying nipple in threaded connection with the valve-seat section and adapted to be moved with relation to the valve-seat, a spring connecting the stem of said valve to the nipple whereby a movement of the nipple with relation to the valve-seat will cause a bodily movement of the valve and spring to seat and unseat the valve.

2. In a back-pressure valve, the combination of a headed exteriorly-threaded valve-section having an internally-tapered valve-seat therein, a jam-nut adapted to take the exterior threads of the section to hold a valve-seat section in place, an air-conveying two-part nipple in threaded connection with the valve-seat section and adapted to be moved with relation to the valve-seat, a tapered valve carried by and movable with and independently of said valve-seat section, and a spring connecting the stem of said valve with the nipple whereby a movement of the nipple will cause the seating and unseating of the valve and an independent movement of said valve will also be allowed.

CARL GRAF.

Witnesses:
FRITZ SCHNELL,
FLORENCE MILLER.